United States Patent
Furr

[19]

[11] Patent Number: 5,993,185
[45] Date of Patent: Nov. 30, 1999

[54] DECK PLATE ASSEMBLIES FOR FORMING CAPSULES

[75] Inventor: Douglas K. Furr, Orem, Utah

[73] Assignee: Farmacapsulas S.A., Barranquilla, Colombia

[21] Appl. No.: 08/803,840

[22] Filed: Feb. 24, 1997

Related U.S. Application Data

[60] Provisional application No. 60/013,837, Mar. 21, 1996, and provisional application No. 60/028,087, Oct. 7, 1996.

[51] Int. Cl.⁶ .............................. B29C 41/14; B29C 41/46
[52] U.S. Cl. ......................... 425/162; 425/170; 425/270; 425/804
[58] Field of Search .................................. 425/270, 269, 425/804, 272, 275, 143, 162, 170; 249/78

[56] References Cited

U.S. PATENT DOCUMENTS

| | | | |
|---|---|---|---|
| 338,754 | 3/1886 | Krehbiel | 264/301 |
| 1,527,659 | 2/1925 | Wilkie | 264/301 |
| 1,787,777 | 1/1931 | Colton | 425/96 |
| 2,299,039 | 10/1942 | Scherer | 264/301 |
| 2,526,683 | 10/1950 | Murphy | 220/8 |
| 2,568,094 | 9/1951 | Smith | 156/145 |
| 2,821,749 | 2/1958 | Figlio | 425/272 |
| 2,846,353 | 8/1958 | Pipher | 424/451 |
| 2,869,178 | 1/1959 | Kath | 29/37 R |
| 2,936,493 | 5/1960 | Scherer | 264/138 |
| 3,264,802 | 8/1966 | Kath | 53/140 |
| 3,617,588 | 11/1971 | Langman | 264/486 |
| 3,632,700 | 1/1972 | Oglevee | 264/40.4 |
| 3,723,585 | 3/1973 | Nussbaum | 264/225 |
| 3,794,453 | 2/1974 | Padilla et al. | 425/270 |
| 4,017,242 | 4/1977 | Mercer | 425/543 |
| 4,208,574 | 6/1980 | Schafer | 249/78 |
| 4,247,006 | 1/1981 | Bodenmann et al. | 264/304 |
| 4,586,690 | 5/1986 | Hartel | 249/78 |
| 4,627,808 | 12/1986 | Hughes | 425/270 |
| 4,688,622 | 8/1987 | Gellert | 164/61 |
| 4,705,658 | 11/1987 | Lukas | 264/489 |
| 4,964,943 | 10/1990 | Kruger et al. | 249/78 |
| 4,993,137 | 2/1991 | Muto et al. | 29/451 |
| 5,469,330 | 11/1995 | Karabatsos et al. | 361/704 |
| 5,750,157 | 5/1998 | Grosswald et al. | 425/143 |

FOREIGN PATENT DOCUMENTS

| | | |
|---|---|---|
| 1.437.245 | 3/1966 | France . |
| 89221 | 10/1896 | Germany . |
| 38 08 363 | 9/1989 | Germany . |
| 672814 | 5/1952 | United Kingdom . |
| 1 326 906 | 8/1973 | United Kingdom . |
| 2 076 706 | 12/1981 | United Kingdom . |
| 90/11173 | 10/1990 | WIPO . |
| 92/21311 | 12/1992 | WIPO . |
| 95/22449 | 8/1995 | WIPO . |

OTHER PUBLICATIONS

Abstract of JP 61–225009 (Pub. Date: Jun. 10, 1986), Patent Abstracts of Japan, European Patent Office.

"Hard Geletin Capsule Machine," Evergreen Packaging Equipment—International Paper Liquid Packaging Division Product Brochure, Jun. 1994.

Abstract of SU 1 544 526 A, Derwent Publications Ltd., London, Great Britain (Feb. 23, 1990).

*Primary Examiner*—Robert Davis
*Attorney, Agent, or Firm*—Foley & Lardner

[57] ABSTRACT

A pin mold and pin bar assembly for use in a methylcellulose capsule-making machine includes a pin bar, an insulating strip, and a pin mold mounted to the pin bar and insulating strip. The pin mold has a shell composed of stainless steel and a copper core. The subject invention also includes a deck plate assembly for use with the pin mold and pin bar assembly. The deck plate assembly includes a deck plate, at least one heating element, a sensor, and a power supply. The deck plate assemblies may be arranged in a kiln section of a methylcellulose capsule-making machine and may be heated to desired temperatures independent of adjacent deck plate assemblies.

7 Claims, 8 Drawing Sheets

DECK PLATE ASSEMBLIES FOR FORMING CAPSULES

This application claims the benefit of U.S. Provisional Application No. 60/013,837 filed Mar. 21, 1996, and U.S. Provisional Application No. 60/028,087 filed Oct. 7, 1996.

BACKGROUND OF THE INVENTION

This invention relates to a novel pin bar and pin mold assembly and associated deck plate assembly for manufacturing capsules. More specifically, this invention relates to a pin bar and pin mold assembly and deck plate assembly for manufacturing methylcellulose pharmaceutical capsules.

Manufacture of hard shell gelatin capsules is carried out by a capsule-making machine. Typical of such capsule-making machines are those disclosed in U.S. Pat. Nos. 338,754; 1,787,777; 2,299,039; 2,568,094; 2,936,493; 3,632,700; 3,794,453; and 4,705,658. Capsule-making machines are divided into several sections, each section performing a different manufacturing step. A pin bar carries pin molds upon which capsules are formed. FIG. 1 shows a conventional stainless steel pin mold 10 mounted to a segment of a pin bar 12. The pin mold 10 has an extension 14 at one end which is fixedly mounted to the pin bar segment 12. The extension 14 has an outwardly sloping portion 16 that is rivetted into place in the pin bar segment 12. The pin bar passes through each capsule-making machine section and, at the end of the manufacturing cycle, delivers finished capsules.

To better understand the advance of the present invention, a method of manufacturing gelatin capsules in a conventional capsule-making machine follows. First, pin molds carried on a pin bar are lubricated in a greasing section of the capsule-making machine. The pin bar then passes to a dipping section. In the dipping section, pin bars are collected in groups and oriented with the pin molds facing downward. The pin bars are then lowered so that the pin molds dip into a liquid aqueous solution of gelatin, maintained at the proper consistency and temperature. The temperature of the gelatin solution is somewhat higher than the pin molds' temperature. The pin molds remain in the solution until a certain amount of the gelatin solution collects on each pin mold in a thin film. The pin bars are then lifted from the solution and moved laterally into an elevating device. The elevating device lifts the pin bars to an upper level in the machine and simultaneously rotates them through the atmosphere to preliminarily cool and set the gelatin coating evenly. The pin bars are then moved through a kiln section across a series of deck plates, or, in more recent machine designs, rollers, toward the back of the machine. Where deck plates are used, the deck plates are typically relatively thin steel sheets of plain carbon steel. At the far end of the kiln section, the pin bars are lowered from the upper level of the kiln section to a lower level. The pin bars pass forward through the kilns to a table section where gelatin film drying is completed. In the table section, individual pin bars are turned on their sides with the pin molds pointing horizontally outward. The pin bars are then pushed into an automatic section where the dried capsule films are stripped from the pin molds, and knives trim excess gelatin from the open ends of the films. The capsule films are then mated together, or joined, and the complete capsules are dropped onto a conveyor which carries them to suitable receptacles. After the capsules have been stripped from the pin molds, the pin bars move out of the automatic section and into the greasing section where the manufacturing process starts anew.

Since the introduction of hydroxypropylmethylcellulose ethers, more commonly known under the trademark METHOCELS, attempts have been made to convert or modify conventional gelatin capsule-making machines to produce methylcellulose capsules. The need in the worldwide marketplace for non-gelatin, kosher pharmaceutical capsules has spawned these attempts.

Companies experimenting in this direction have enjoyed only limited success in forming methylcellulose capsules on conventional pin molds used to form gelatin capsules. Gelatin and methylcellulose require different manufacturing parameters because these materials gel at different temperatures. Gelatin solutions liquefy when hot and gel as they cool. Hence, gelatin capsules may be dip-formed on relatively cool pin molds. Methylcellulose solutions, however, liquefy when cool (around room temperature or 70 degrees Fahrenheit) and gel at about 150–180 degrees Fahrenheit, depending on the solution's chemical properties. Thus, the pin molds must be heated prior to dipping to form methylcellulose capsules. Moreover, after dipping, the pin molds must remain heated during the manufacture cycle, at times up to 175 degrees Fahrenheit, until sufficient moisture is eliminated from the methylcellulose capsule films on the pin molds.

Maintaining conventional pin molds at sufficiently high temperatures to form methylcellulose capsules has proven problematic. For example, conventional pin molds generally are composed of solid, food-grade, 304 and 316 stainless steels which are particularly resistant to absorption of heat as compared to other steels. An additional problem with stainless steel is that it absorbs heat non-uniformly and thus would result in unevenly formed methylcellulose capsule films.

In the past, companies attempting to modify gelatin capsule-making machines into ones capable of making methylcellulose capsules blow high heat at the pin molds in the machine's kiln sections. This heat theoretically dries, or cooks, the methylcellulose from the outside inward. Deck plates in the kilns which carry the pin bars may be heated to raise the temperature of the pin bars prior to dipping. These deck plates are heated to a uniform temperature and apply that heat to the base and exterior of the pin mold.

A significant problem with prior kiln sections and deck plates, and the outside-to-inside manner of heating the stainless steel pin molds to make methylcellulose capsules, is that externally induced heat dissipates quickly from the surface of the pin molds and pin bars and thus is inefficient and costly. Moreover, the pin molds are often heated unevenly, resulting in thinning or deformation of the methylcellulose capsules. Irregularly shaped capsules jam automatic capsule filling machines.

Another source of inefficiency of external heat transfer to the pin molds via primarily heated, or superheated, air is that heat loss occurs rapidly as a result of the high polish of the pin molds. In addition, methylcellulose deposited onto the pin during dipping acts as a kind of thermal barrier, or insulator, further reducing efficiency when hot air is applied directly to the outside surface of the pin mold. And, because the kiln section is convection heated to temperatures above 150 degrees Fahrenheit, workers manning the machine feel extreme discomfort from the heat. Some of the heat generated in the kiln section vents outside of the kiln, making for poor work conditions.

Finally, externally induced heat tends to heat only the outside surface of conventional pin molds because of the relative heat conduction inefficiency of stainless steel relative to other materials, such as aluminum, copper, silver, and gold. Therefore, the pin mold becomes only superficially heated, or only heated on its surface. Meanwhile, the relatively "cool" core of the stainless steel pin mold quickly and continuously absorbs the heat induced onto the pin mold's surface, thus cooling the surface below the optimum thermal gelation temperatures for methylcellulose.

Additional patents known to applicant but believed to be peripheral in relevance to the present invention are the following: U.S. Pat. Nos. 1,527,659 and 4,247,006.

The difficulties suggested in the preceding are not intended to be exhaustive but rather are among many which may reduce the capability of prior pin molds, pin bars, deck plates, and the current modifications associated with capsule-making machines to manufacture methylcellulose capsules. Other noteworthy problems may also exist; however, those presented above should be sufficient to demonstrate that such methods and apparatuses appearing in the past will admit to worthwhile improvement.

SUMMARY OF THE INVENTION

Accordingly, it is therefore a general object of the invention to provide a pin mold and pin bar assembly and deck plate assembly which will obviate or minimize difficulties of the type previously described.

It is a specific object of the invention to provide a pin mold and pin bar assembly which enables manufacture of high quality methylcellulose capsules.

It is another object of the invention to provide a pin mold and pin bar assembly which enables uniform heat distribution to a methylcellulose film on a pin mold.

It is yet another object of the invention to provide a deck plate assembly which enables location-specific temperature control at all locations throughout the kiln section of a capsule-making machine.

It is still another object of the invention to provide a pin mold and pin bar assembly and deck plate assembly which efficiently maintains heat throughout the pin mold during the capsule manufacturing process.

It is a further object of the invention to provide a method of manufacturing the pin bar and pin mold assembly which maximizes heat transference from a deck plate through the pin molds to capsule films on the pin molds.

A preferred embodiment of the invention which is intended to accomplish at least some of the foregoing objects includes a pin mold and pin bar assembly for manufacturing a methylcellulose pharmaceutical capsule.

The pin mold and pin bar assembly comprises a pin mold having a pin mold shell composed of stainless steel and a solid copper core. The ratio of the diameter of the core to the thickness of the wall of the pin mold shell may range from 3.3:1 to 6.3:1 and, in a preferred embodiment, is 6.3:1. The geometry, features, and finish of the pin mold shell conform to predetermined industry standards for pharmaceutical capsules. The pin molds are mounted to an upper surface of a pin bar. The pin molds are spaced from one another on the pin bar in conformance with industry standards. A strip of insulating material with a high "R-factor" is mounted on the upper surface of the pin bar to channel heat from the pin bar to the core of the pin molds and reduce heat losses.

A method of manufacturing the pin mold and pin bar assembly in accordance with the present invention comprises positioning an insulating strip on a top surface of a pin bar so that holes in the pin bar align with holes in the insulating strip; inserting ring elements into the holes in the insulating strip; inserting a pin mold shell of a pin mold through each aligned pair of holes; and inserting a core of a pin mold into each pin mold shell.

A deck plate assembly for use in a capsule-making machine, and preferably used with the present pin bar and pin mold assembly, comprises a deck plate and at least one heating element adapted for mounting to the deck plate to control the temperature of the deck plate. The deck plate assembly further includes a power supply electrically connected to the heating element, and a sensor mounted to the deck plate for detecting the temperature of the deck plate. The deck plate assembly may also include a chamber located, for example, in the bottom surface of the deck plate, for receipt of the heating element and a cap element that is releasably mounted to the chamber. A wall of the chamber and an inner surface of the cap element preferably surround the heating element in an air tight seal to maximize heat transfer from the heating element to the deck plate.

In a preferred embodiment, four heating elements are mounted to a bottom surface of the deck plate in chambers machined into the bottom surface. In addition, a control circuit electrically communicates with the power supply and the sensor to control the amount of power sent to the heating elements.

The heating elements may comprise cylindrical heat cartridges. In this instance, the chambers in the deck plate each include a semicircular groove for receipt of a heat cartridge, and the cap elements include a similar semicircular groove. In order to ensure efficient heat exchange between from the heat cartridge to the deck plate, the chamber groove and the cap groove have a radius approximately equal to the radius as the heat cartridge. In a preferred embodiment of the invention, the radius of the grooves should be no less than the radius of the heat cartridge and should be no more than 0.0075 inches larger than the radius of the heat cartridge. Any space between the heat cartridge and either the deck plate or the cap element may significantly impair heat exchange.

The deck plate assemblies are arranged in the kiln section of a capsule-making machine side-by-side. A plurality of kilns are positioned above the deck plate assemblies. Vertical supports support the deck plate assemblies via brackets. The deck plate assemblies are adapted to support a plurality of pin bar and pin mold assemblies with the pin molds extending away from the deck plate assemblies and toward the kilns.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and, together with the general description given above and the detailed description of the preferred embodiments given below, serve to explain the principles of the invention.

DETAILED DESCRIPTION OF THE PREFERRED EMBODIMENTS

Figure 2:
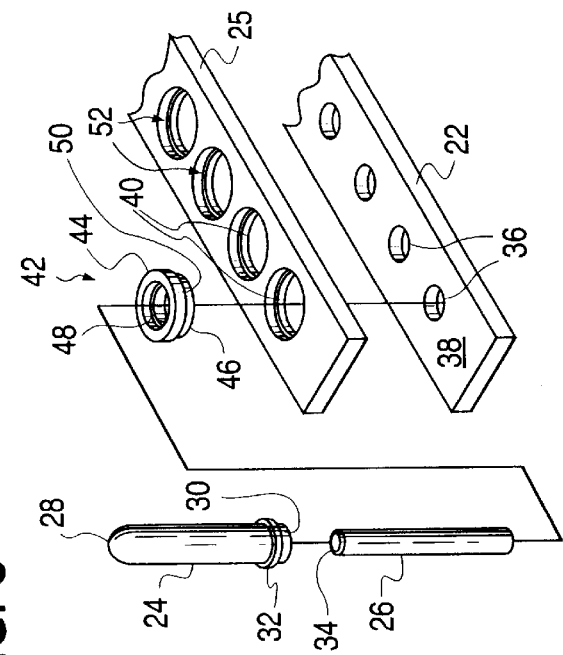
FIG. 2 is a cross-sectional side elevation view of a single pin mold unit of a pin mold and pin bar assembly in accordance with the invention.
Figure 3:
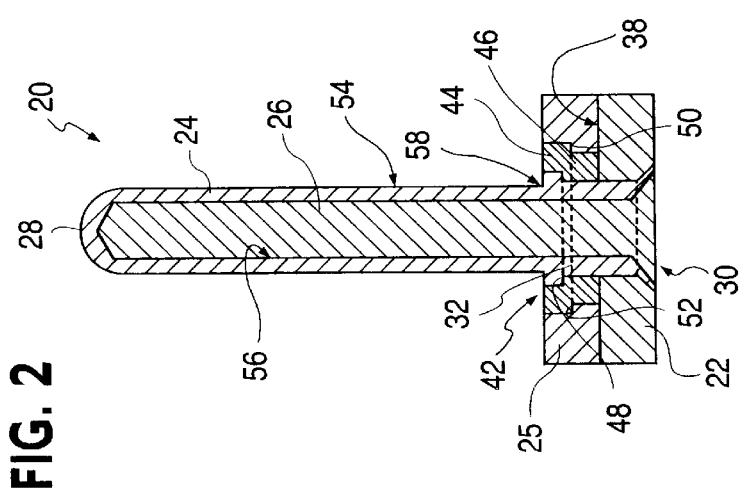
FIG. 3 is an exploded view of the pin mold and pin bar assembly.

Referring now to the drawings, wherein like numerals indicate like parts, and initially to FIGS. 2 and 3, there will be seen a pin mold and pin bar assembly in accordance with the invention. The pin mold, generally indicated 20, is mounted to a pin bar 22 and an insulating strip 25. The pin mold 20 of the present invention is particularly suited for manufacturing methylcellulose pharmaceutical capsules.

The pin mold 20 has a pin mold shell 24, preferably composed of stainless steel, and a separately formed core 26 composed of copper, or any material with similar sufficient heat transfer characteristics. The metal-to-metal fit between the stainless steel pin mold shell 24 and the copper core 26 ensures maximum heat transfer from the pin bar 22 to the surface of the pin mold 20.

The pin mold shell 24 has a rounded end 28 sized and configured to make either a male capsule portion (capsule body portion) or a female capsule portion (capsule cap portion). The pin mold shell 24 also has an open end 30 for receipt of the core 26. The pin mold shell 24 further has an outwardly extending annular flange 32. With the exception of the region of the annular flange 32 and the region of the rounded end 28, the pin mold shell 24 generally has a uniform diameter prior to installation in a pin bar, as seen in FIG. 3. When installed, the pin mold shell has a slightly larger diameter adjacent the open end 30, as will be described in connection with FIGS. 5A–5C. Like the pin mold shell 24, the core 26 also has uniform diameter prior to installation, with the exception of its tip 34.

The pin bar 22 has a series of holes 36 for receipt of the pin molds. The insulating strip 25 is disposed on an upper surface 38 of the pin bar 22 and has holes 40 which align with the holes 36 of the pin bar 22, as shown in FIG. 3. The holes 36 and 40 are of sufficient diameter to receive the open end 30 of the pin mold shell 24. The insulating strip 25 is preferably composed of an injection moldable material, such as nylon 6/6 resin which is 33 percent glass filled.

The pin bar and pin mold assembly also includes a ring element 42, for example, of the type referred to as a keeper ring. The ring 42 is preferably composed of beryllium copper. The pin mold shell 24 is set and secured in the pin bar 22 and the insulating strip 25 through the ring 42. The ring 42 has an upper portion 44 and a lower portion 46 of less diameter than the upper portion 44 to form an upwardly facing annular shoulder 48 and a downwardly facing shoulder 50. When the pin mold shell 24 is channeled through the aligned holes of the pin bar 22 and the insulating strip 25, the annular flange 32 of the pin mold shell 24 sits on the upwardly facing annular shoulder 48 of the ring 42. Each hole 40 in the insulating strip 25 is configured with a larger diameter at the top than at the bottom to form an upwardly facing shoulder 52 so that the ring 42 seats in the hole 40 with its downwardly facing shoulder 50 resting on the upwardly facing shoulder 52 of the insulating strip 25. The ring 42 keeps the insulating strip 25 in its proper location and orientation on the pin bar 22. Assembly of the pin mold 20 to the pin bar 22 and the insulating strip 25 will be described below in more detail in connection with FIGS. 5A–5C.

The pin mold shell 24 has an outer surface 54 and an inner surface 56. The pin mold shell 24 has a thickness measured from the outer surface 54 to the inner surface 56, or a wall thickness. The ratio of the diameter of core 26 to the wall thickness of the pin mold shell 24 preferably ranges from approximately 3.3:1 to approximately 6.3:1 and has a tolerance of plus or minus fifteen percent. In the preferred embodiment, the core diameter to pin mold shell wall thickness ratio is approximately 6.3:1. For example, where the diameter of the core 26 is 0.22 inches, a preferred pin mold shell wall thickness is 0.035 inches. It will be understood by those skilled in the art that the core diameter to pin mold shell wall thickness ratio may be varied provided that the pin mold still transfers a suitable amount of heat through the pin mold shell 24 via the core 26 to capsule film coated on the outer surface 54 of the pin mold shell 24.

The outer surface 54 of the pin mold shell 24 is connected to the annular flange 32 by a generous radial fillet 58 to prevent fatigue during capsule forming and stripping. This fillet 58 should be no less than 10 percent of the pin mold shell diameter.

Conventional pin molds generally are composed of solid, food-grade stainless steels, including 303, 304, and 316 stainless steels. Stainless steel is particularly resistant to absorption and transmission of heat as compared to other steels. Stainless steel absorbs heat non-uniformly, often resulting in unevenly formed methylcellulose capsule films.

The present invention replaces solid stainless steel with a stainless steel pin mold shell and a core of pure copper billet to remedy this problem. Copper has a high unilateral coefficient of thermal conductivity and, thus, the pin molds of the present invention readily and uniformly absorb heat through their core and uniformly transfer that heat through the pin mold shell to the methylcellulose capsule film coated on the surface of the pin mold shell.

An advantage of the present invention is that methylcellulose in a gel state acts as its own insulator once applied to a pin mold, adding substantially to the pin mold's ability to absorb and retain available heat internally through its copper core. This reduces the amount of necessary heat generated in the overall process. As compared to conventional capsule-making machines that apply heat to the outside of the pin mold, the majority of the heat generated in the kiln sections vents to the outside of the kiln sections. Giant cooling systems must thus be employed to cool the rooms housing the capsule-making machines. With the present pin mold and pin bar, cooler, gentler air may be used to counterbalance the relatively small amount of heat dissipated by the pin molds, making for better working conditions.

Figure 4:
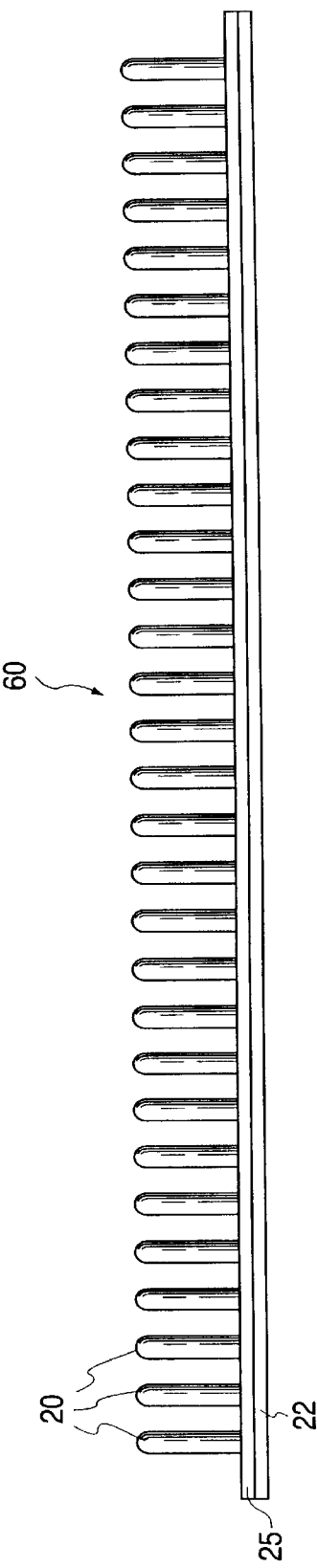
FIG. 4 is a side elevation view of a pin bar with pin molds mounted thereon in accordance with the invention.

FIG. 4 shows a side view of a pin bar 22 and insulating strip 25 with thirty pin molds 20 affixed to the pin bar 22 and the insulating strip 25 via rings (not shown). The insulating strip 25 channels heat from the pin bar 22 to the copper core of the pin molds 20; the insulating strip 25 thus reduces the dissipation of heat from the pin bar 22 into the atmosphere. The embodiment shown in FIG. 4 shall be referred to as the pin bar and pin mold assembly 60 in the detailed description of FIGS. 6 and 7 below.

Figure 5:
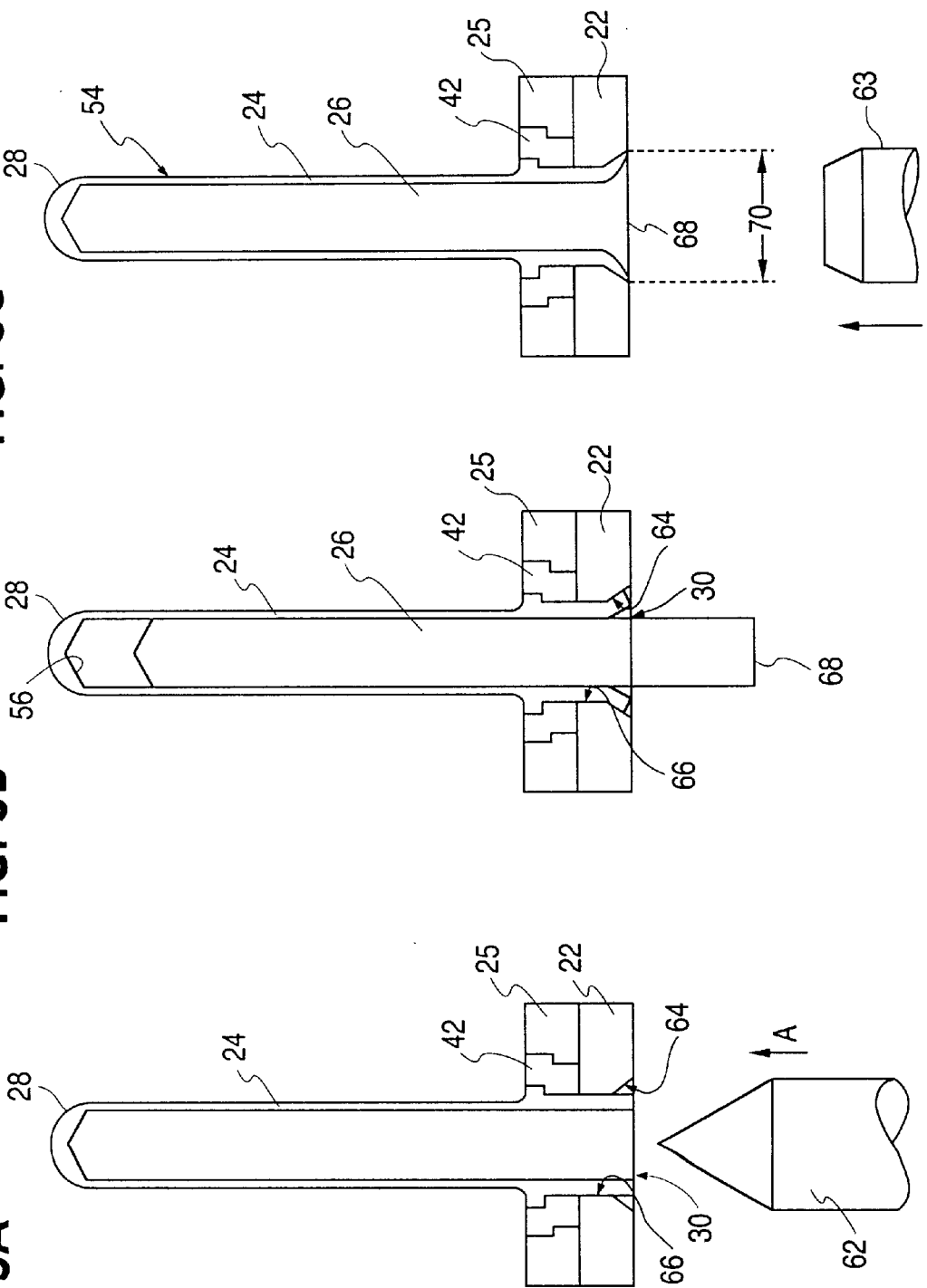
FIGS. 5A–5C are cross-sectional side elevation views of a single pin mold unit depicting a method of manufacturing the present pin mold and pin bar assembly in accordance with the invention.

FIGS. 5A–5C illustrate the method of manufacturing the pin mold and pin bar assembly 60 according to the present invention. Initially, the insulating strip 25 is positioned atop the pin bar 22 so that the holes 36 and 40 are aligned. A ring 42 is seated in each hole 40 of the insulating strip 25, and a pin mold shell 24 is lowered through the ring 42 and hole 40 into the position shown in FIG. 5A.

The holes 36 in the pin bar 22 have an inclined surface, or countersink, 64 and a vertically extending surface 66. A tool 62 is moved in the direction of arrow A to swage the tubular walls of the open end 30 against the countersink 64 of the pin bar 22. In the preferred embodiment, the countersink 64 is angled at approximately 60 degrees with respect to the vertically extending surface 66 of the pin bar 22.

Once the side of the open end 30 is forged against the countersink 64, the core 26 is inserted into the open end 30, as shown in FIG. 5B. A flat nose tool 63 is then pressed against the bottom surface 68 of the core 26 to push the core 26 into the pin mold shell 24 so that the tip 34 of the core 26 fits against the inner surface 56 of the rounded end 28 of the pin mold shell 24. The flat nose tool continues to push against the bottom surface 68 of the core 26 so that the core 26 peens against the region adjacent the open end 30 of the pin mold shell 24, as shown in FIG. 5C. This deforms the side of the open end 30 against the countersink 64 to reduce the wall thickness of the pin mold shell 24 at the outermost point of its open end 30 and creates a large exposed surface with a diameter 70 at the bottom surface 68 of the core 26. Better heat transference from a deck plate to the core is facilitated by the larger exposed surface.

The pushing action of the flat nose tool against the bottom surface 68 of the core 26 also pushes the core 26 laterally outward against the inner surface 56 of the pin mold shell 24 to create a metal-to-metal seal between the outer surface of the core 26 and the inner surface 56 of the pin mold shell 24. The core 26 thus may uniformly distribute heat to methylcellulose coated on the outer surface 54 of the pin mold shell 24.

The present invention also contemplates heated deck plates permanently mounted in position in the kiln section of the machine. Deck plates used in the past in gelatin capsule-making machines were not heated or otherwise temperature-controlled because gelatin solutions gel as they cool. Methylcellulose solutions, however, gel when heated. Thus, the deck plates of the present invention are designed to retain heat for sustained periods of time and to efficiently transfer that heat to the pin bars and pin mold assemblies carried by the deck plates. The structure of the deck plates will be described in more detail in connection with FIGS. 8–12.

Figure 1:
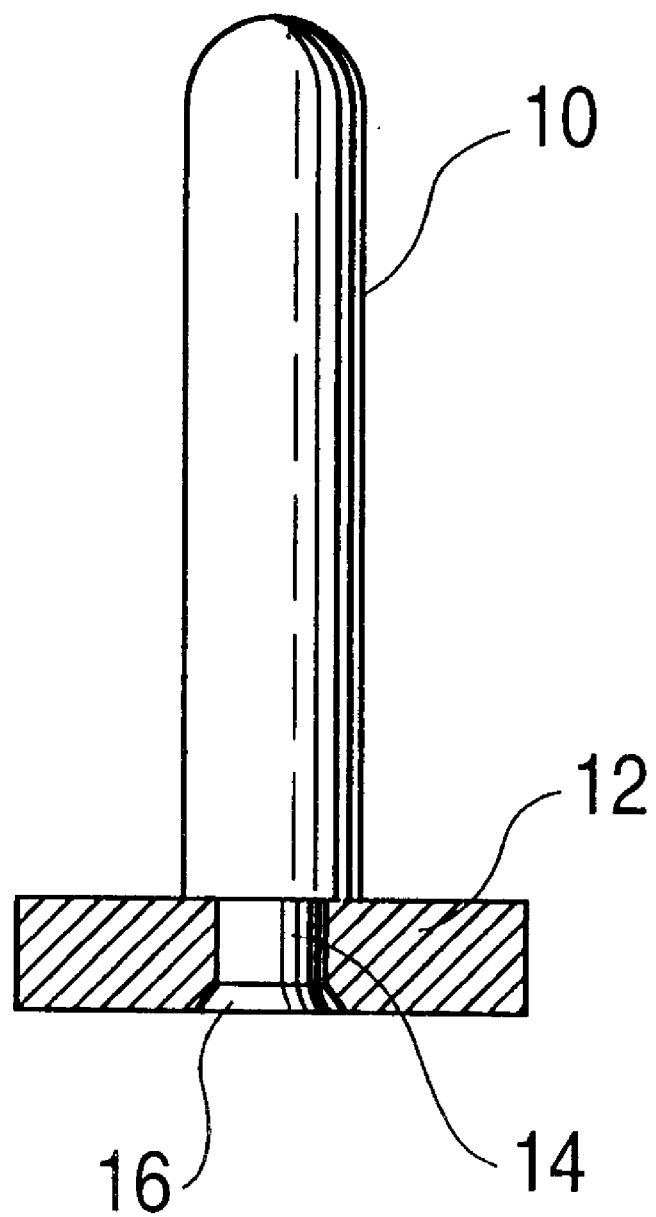
FIG. 1 is an end view, in partial cross section, of a conventional pin mold and pin bar.
Figure 6:
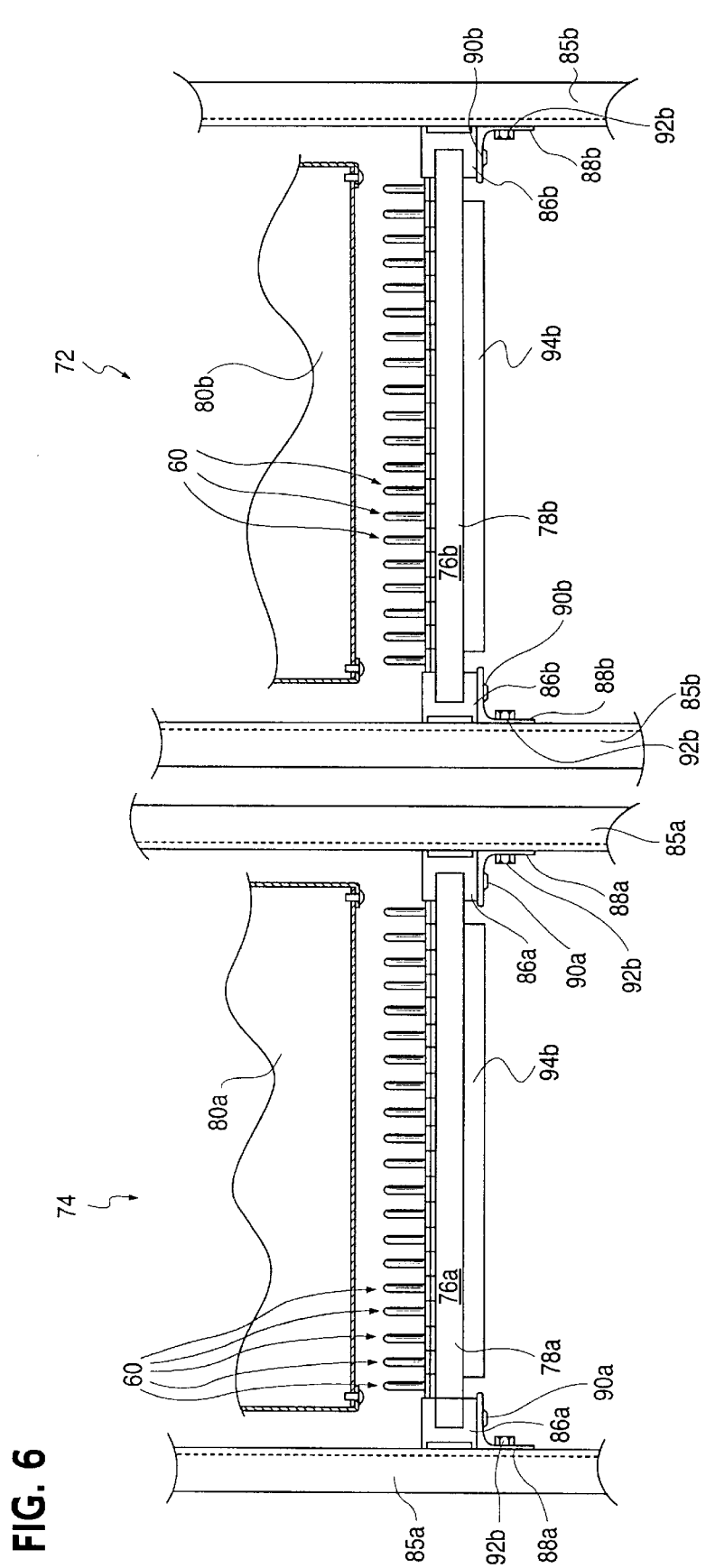
FIG. 6 is an end view of an upper level of the kiln section of a capsule-making machine in accordance with the invention.

FIG. 6 shows an end view of the capsule-making machine. A preferred embodiment of the capsule-making machine has two kiln sections that run in parallel. The kiln sections comprise the majority of the machine, for example as depicted in FIGS. 1A and 1B of U.S. Pat. No. 1,787,777 to Colton. FIG. 6 illustrates a right-hand kiln section, generally indicated 72, and a left-hand kiln section, generally indicated 74 (denoted right-hand and left-hand for descriptive convenience). One section makes the male portion of a capsule, and the other makes the female portion of the capsule. From the end view of the capsule-making machine in FIG. 6, one sees the side 76a of a deck plate 78a mounted in the left-hand kiln section 74 and the side 76b of another deck plate 78b mounted in the right-hand kiln section 72.

Viewing the capsule-making machine from its side (not shown), pairs of deck plates are mounted side-by-side to work in tandem and are heated to the appropriate temperature, depending on their position along the kiln section. In a preferred embodiment, one hundred and sixty plates, or eighty pairs of these plates working in tandem, are used in the capsule-making machine. It will be understood that, in other embodiments of the invention, pairs of adjacent deck plates need not work in tandem, but rather each individual deck plate may be heated to an appropriate temperature.

The deck plates of the subject invention may be retrofit to conventional gelatin capsule-making machines, but are particularly suitable in connection with machines for making methylcellulose capsules. In methylcellulose capsule-making machines, it is advantageous to be able to monitor and control the temperature of the pin molds as they travel through the kiln section of the machine. Less heat is needed at the deck plates in the lower portion of the kiln section because, at that stage of the process, the methylcellulose is more stable. The present invention makes this possible through use of a plurality of temperature-controlled deck plates, each being part of a deck plate assembly.

The ability to control the temperature of each deck plate offers significant cost savings because of the high expense of induction heat. For example, the deck plates at the end of the kiln section could be maintained at ambient temperature with no deleterious effect on the quality of the metlhylcellulose capsules produced by the machine. In a methylcellulose capsule-making machine, the pin bars and pin molds must be kept hot when they first exit the dipping section. As the pin bars progress along the kiln section, the pin bars may be allowed to cool, and, by the time the pin bars reach the table section of the machine, they may be reduced to ambient temperature. The desired temperature of the pin molds at any point in the kiln section depends upon the moisture content of the methylcellulose gel. So, the temperature of the individual or, in the preferred embodiment, pairs of deck plates are selected to control moisture.

The width dimension of the pair of deck plates is approximately equal to the length of a pin bar. As shown in FIG. 6, pin bar and pin mold assemblies are placed side-by-side on each deck plate pair. The length of a pin bar extends across the width of each of the pair of deck plates. In other words, in this preferred embodiment, the length of a pin bar approximately equals the width of two deck plates mounted side-by-side.

Figure 7:
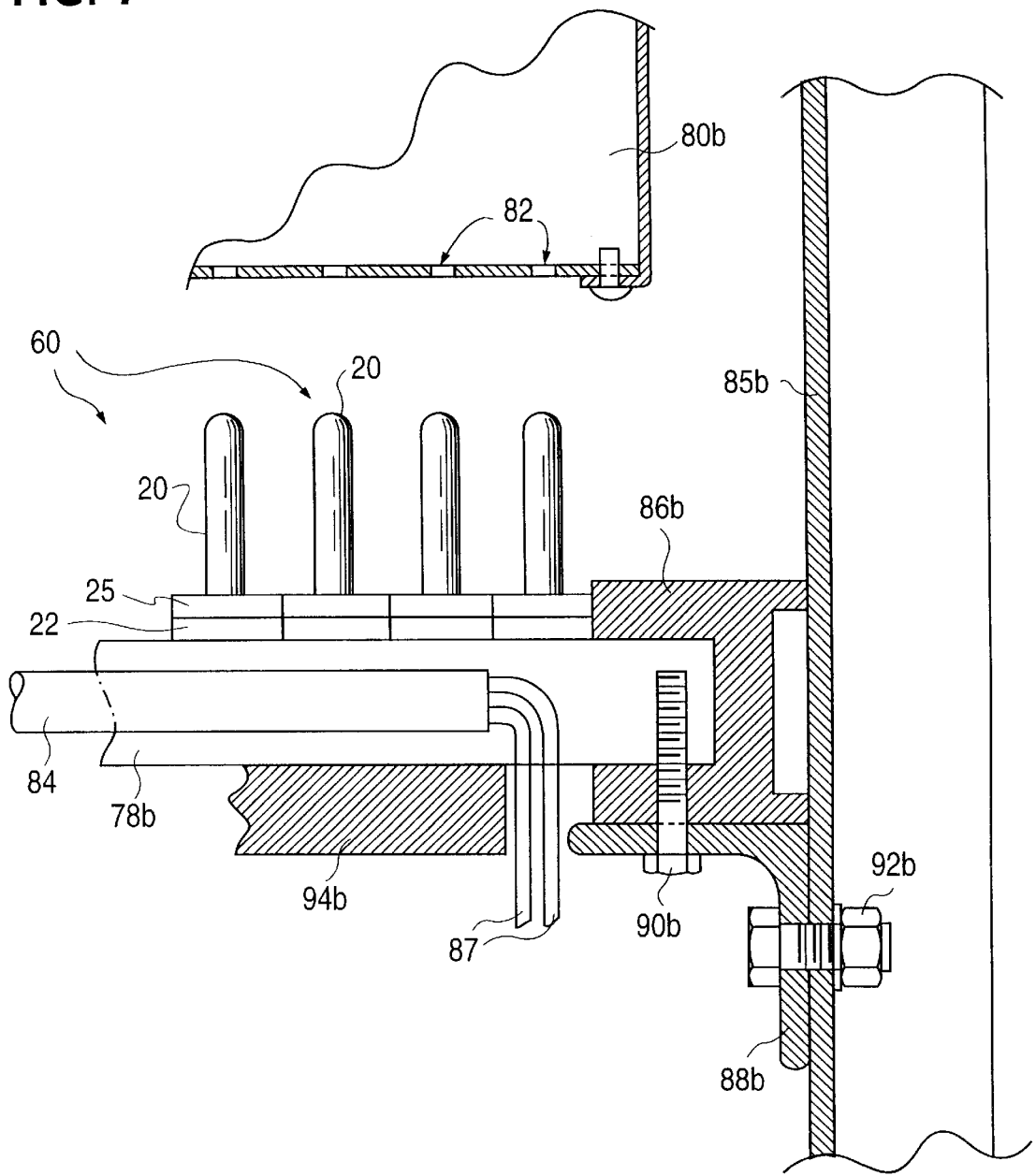
FIG. 7 is an enlarged, side elevation view, in partial cross-section, of the right-hand side of the kiln section of FIG. 6.

Referring to both FIGS. 6 and 7, the pin bar and pin mold assemblies 60 rest upon deck plates 78a and 78b of a capsule-making machine in accordance with a preferred embodiment of the invention. Each deck plate 78a and 78b carries twenty pin bar and pin mold assemblies. The deck plates 78a and 78b are preferably made of aluminum, and each sits beneath a kiln 80a and 80b. Hot air is blown through holes 82 in the kilns that are positioned above each individual pin mold in the pin bar and pin mold assemblies, as seen in FIG. 7, and 62b onto the outside of the pin molds. The pin molds are also heated from the inside out. As explained above, the deck plates are heated, and the heat is transferred from the deck plate to the pin bar and through the copper core of the pin mold to the outside of the pin mold shell. Because heat rises, placement of the pin bar assemblies atop the heated deck plates results in uniform heat transfer through the pin bars to associated pin molds.

Each deck plate 78a and 78b is heated by heating elements, such as the heat cartridge 84 shown generally in FIG. 7 and in more detail in FIGS. 8–12. Power is supplied to cartridge 84 via wires 87. Alternatively, the deck plates 78a and 78b may be heated by hot water channeled through the deck plates 78a and 78b and controlled to plus or minus one degree Fahrenheit using microprocessor-controlled temperature heating units (not shown).

The deck plates 78a and 78b are mounted in the kiln section to vertical supports 85a and 85b by H-shaped insulator brackets 86a and 86b, which are preferably composed of glass filled nylon. The insulator brackets 86a and 86b prevent heat loss from the edges of the deck plates 78a and 78b. The insulator brackets 86a and 86b also abut the side edges of the outermost pin bar assemblies 60 to prevent heat loss and to guide the assemblies over the deck plates 78a and 78b and along the kiln sections.

The insulator brackets 86a and 86b, and thus the deck plates 78a and 78b, rest on angle-iron brackets 88a and 88b. The deck plates 78a and 78b are secured to the angle-iron brackets 88a and 88b by bolts 90a and 90b, or other suitable fasteners, that extend through insulator brackets 86a and 86b. The angle-iron brackets 88a and 88b in turn are secured to the vertical supports 85a and 85b of the capsule-making machine by bolts 92a and 92 or other suitable fasteners. The deck plates 78a and 78b may also be insulated by strips 94a and 94b, respectively, affixed to the bottom surface of the deck plates 78a and 78b.

The pin bar and pin mold assemblies sit upon the heated deck plates until they are completely saturated with heat. As a pin bar becomes saturated, heat transfers from the pin bar to associated pin molds. Constant heat is maintained in the pin mold and kept at an equilibrium along the entire length of the pin mold. Heat flows freely to the tip of the pin mold via the mold's copper core and then transfers to the mold's stainless steel body. The pin molds thus heat up from the inside. The deck plate continuously and uniformly transfers heat to the pin bar throughout the length of the pin.

Figure 8:
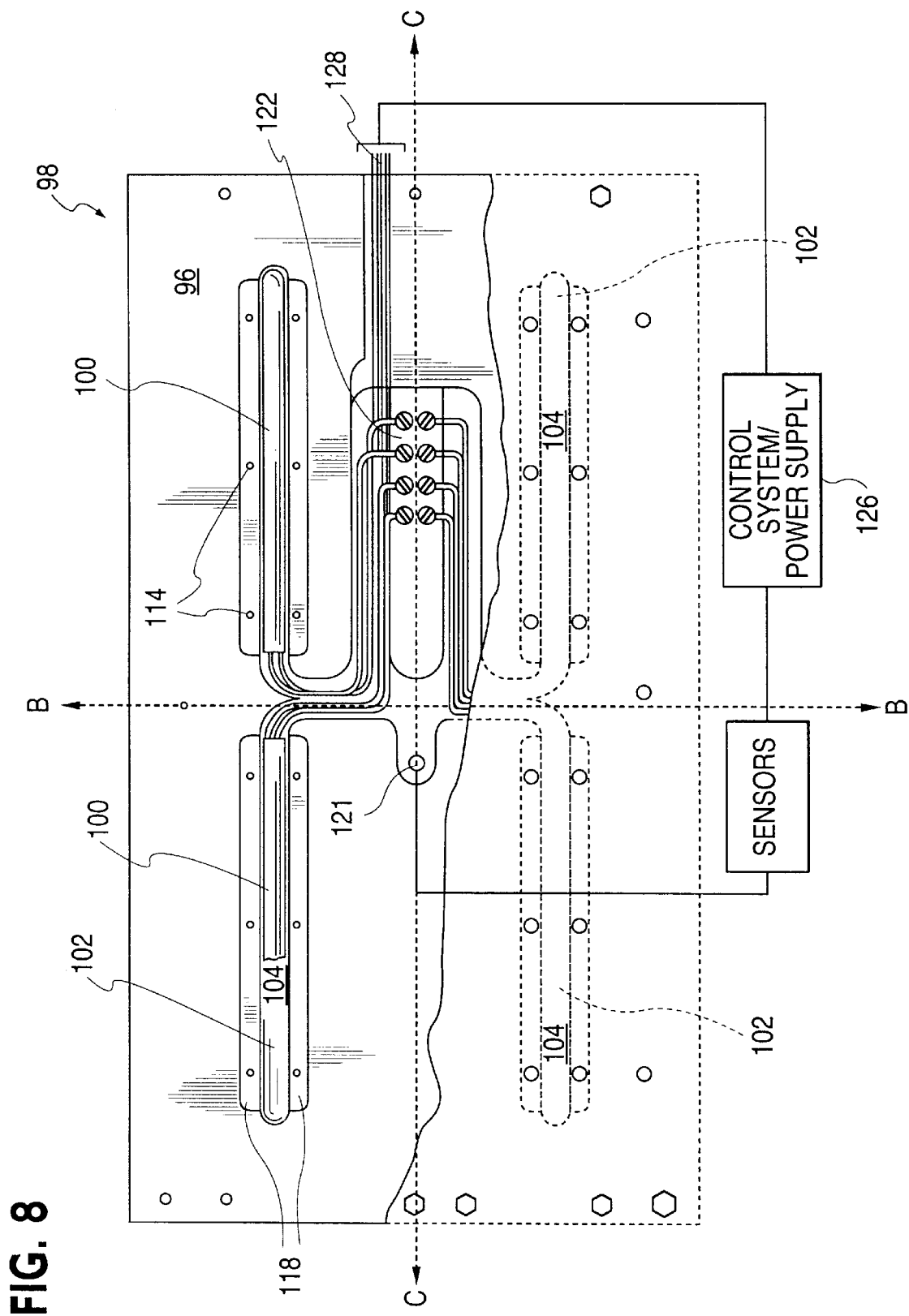
FIG. 8 is a bottom plan view of a deck plate without installment of caps over cartridge-receiving chambers of the deck plate in accordance with the invention.

FIGS. 8–12 show in more detail the structure of the deck plates. Referring to FIG. 8, a bottom surface 96 of a deck plate 98 is shown. Each deck plate 98 preferably carries four heating elements or heat cartridges 100, each in its own cartridge-receiving chamber 102. The cartridges 100 heat the deck plate 98 to an appropriate temperature. The cartridges 100 are positioned on the bottom surface 96 of the deck plate 98 each in essentially one of four quadrants of the deck plate 98, defined by perpendicular dashed lines B—B and C—C. In a preferred embodiment, the cartridges are positioned so that, when a pair of deck plates are mounted side-by-side in position in the kiln section, the cartridges of adjacent deck plates are equidistant from each other. For example, when a first deck plate is mounted adjacent a second deck plate, the heating elements mounted on one half of the bottom surface of the first deck plate (such as on the side above the line C—C in FIG. 8) are spaced equidistant from the heating elements mounted on an other half of the bottom surface of the second deck plate (such as on the side below the line C—C in FIG. 8). This cartridge placement promotes uniform heating of deck plate pairs.

It will be understood that the cartridges need not be placed on the bottom surface of the deck plates; however, their placement on the bottom surface promotes uniform temperature distribution to all areas of the deck plate. Also, in a preferred embodiment of the invention, the cartridges are cylindrically-shaped. The following discussion presumes this cylindrical shape; however, it will be understood that heating elements of different shape and size may be substituted for the cylindrically-shaped cartridges.

Figure 11:
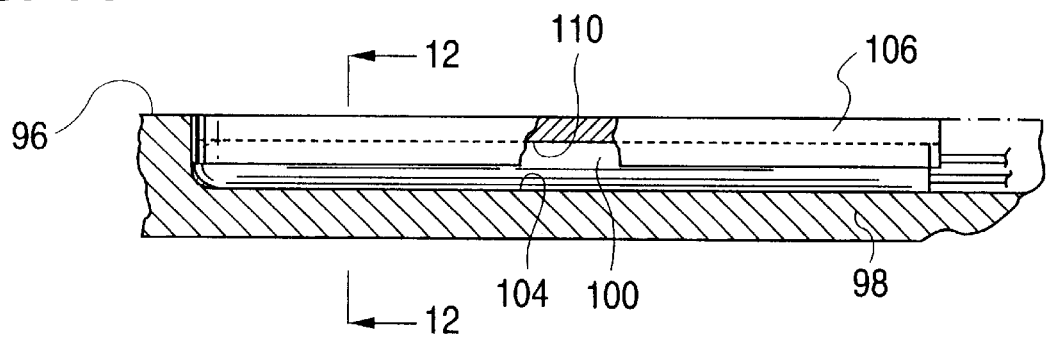
FIG. 11 is side elevation view, in partial cross section, of a cartridge and cap installed in a cartridge-receiving chamber, as taken along line 11—11 in FIG. 9.
Figure 12:
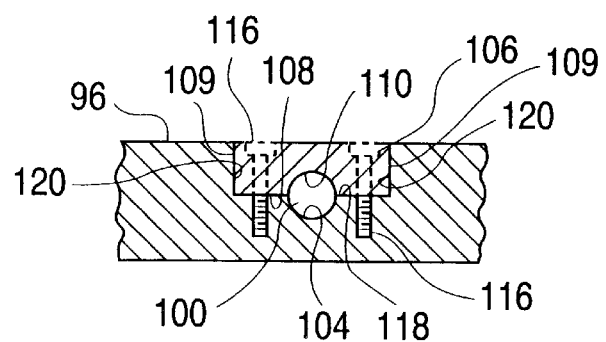
FIG. 12 is a cross-sectional side view of a cartridge-receiving chamber, as taken along line 12—12 in FIG. 11.

Each cartridge-receiving chamber 102 comprises a wall with a semicircular chamber groove 104 located therein for receipt of a cartridge, as shown in FIG. 12. The wall of the cartridge-receiving chamber 102 also has a flat portion 118 and side portions 120. The cartridge fits into, or nests within, the chamber groove 104 machined out of the cartridge-receiving chamber 102, as shown in the upper right-hand quadrant of FIG. 8 and in FIG. 11. The cartridges 100 are precision ground to a certain diameter, and the chamber groove 104 is machined to have a radius approximately equal to, and, in a preferred embodiment, exactly equal to, the radius of the cartridge so that the cartridge nests in the chamber groove.

Figure 9:
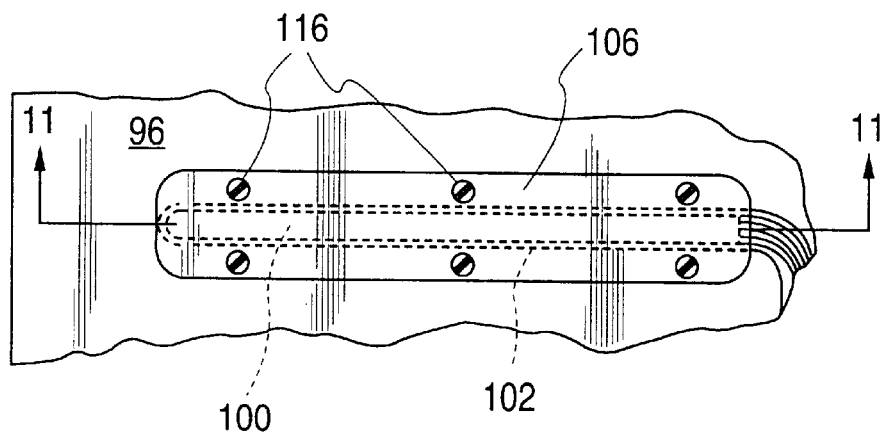
FIG. 9 is a bottom plan view of a cartridge-receiving chamber covered by a cap in accordance with the invention.
Figure 10:
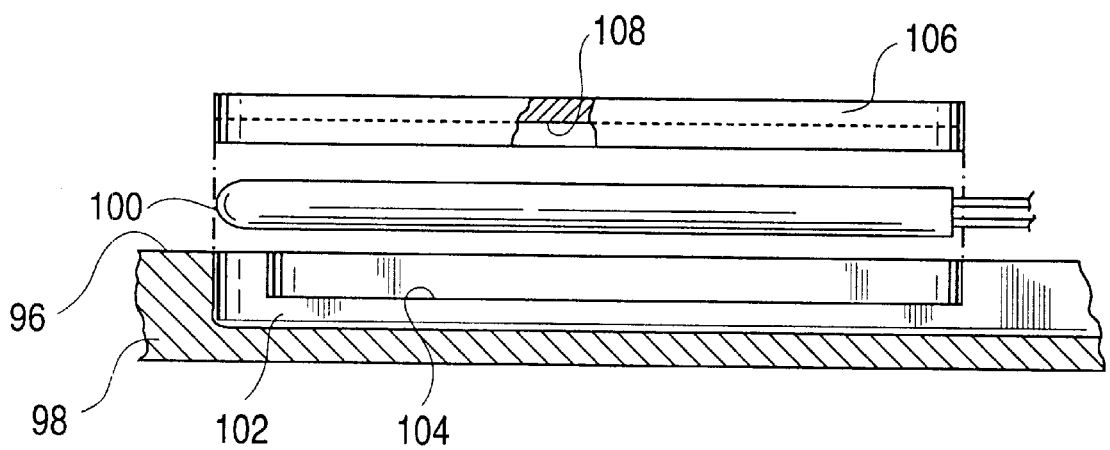
FIG. 10 is an exploded side elevation view, in partial cross section, of a cartridge-receiving chamber, cartridge, and cap in accordance with the invention.

Once a cartridge is fit into the chamber groove, the cartridge-receiving chamber 102 is covered by a cap element 106, as shown in FIGS. 9–11. The cap 106 has an inner surface with a semicircular cap groove 110, shown in FIG. 12, which is similar to the semicircular chamber groove 104. The cap groove 110 has radius approximately equal to, and, in a preferred embodiment, exactly equal to, that of the chamber groove 104 and the cartridge 100 itself. The radius of the grooves 104 and 110 preferably should be no less than the radius of the cartridge and preferably should be no more than 0.0075 inches larger than the radius of the cartridge. Any space between the cartridge and either the deck plate or the cap element may significantly impair heat exchange from the cartridge to the deck plate.

The cap 106 fits within the cartridge-receiving chamber 102 to secure the cartridge 100 in place between the cap 106 and the deck plate 98. The cap 106 is preferably screwed into flat portions 118 of the cartridge-receiving chamber through holes 114 shown in FIG. 8 with cap screws 116 shown in FIGS. 9 and 12. The cap may also have additional holes (not shown) for jack screws to remove the cap from the cartridge-receiving chamber should it become lodged in place.

When the cap is placed into position in the cartridge-receiving chamber, before it is screwed into place, the cap may slightly rock back-and-forth along its longitudinal axis. When the cap is screwed into place, the longitudinal sides of the cap slightly curve toward the cartridge-receiving chamber, as seen in FIG. 12. Ideally, when the cap is mounted to the cartridge-receiving chamber, the cartridge is surrounded by the chamber groove and the cap groove to form an air-tight seal. To maximize heat transfer from the cartridge to the deck plate via the cap, the radius of the cap groove 110 should be exactly the same as the radius of the cartridge. Moreover, the cap should be machined so that, when the cartridge is in place and the cap is tightened down to the deck plate via the cap screws 116, the flat portion 108 and side portions 109 of the inner surface of the cap 106 contacts the flat portion 118 and the side portions 120 of the cartridge-receiving chamber, as shown in FIG. 12. In this manner, the maximum amount of heat transfer can be realized.

Turning back to FIG. 8, each deck plate has a heat sensor 121, such as a thermocouple or the like, mounted to the bottom surface 96 of the deck plate 98. The heat sensor 121 monitors the temperature of the deck plate 96. In other embodiments, more than one heat sensor could be mounted to the plate at various locations to ensure that the plate is being heated uniformly. The heat sensor 121 electronically communicates with an sensor circuit or anaphase circuit 122 which monitors the temperature of the deck plate 96.

The deck plate also carries a terminal strip 124. The terminal strip 124 is electrically connected to each cartridge 100 via wires routed from each cartridge to the terminal strip. The terminal strip 124 is also electrically connected to a control system and power supply 126 via leads 128. The leads may fit into a slot extending from the terminal strip to an edge of the deck plate. A suitable control system is an "Anafaze" 32 loop (multi-loop or MLS) controller unit manufactured by Watlow, Inc. in Saint Louis, Mo.

The temperature of the individual deck plates is monitored by the thermocouple sensor, and the control system determines whether to increase or decrease the deck plate temperature based on the detected temperature and a desired temperature. Thus, each deck plate may operate as an individual contained unit within the kiln section to permit various temperatures along the length of the kiln section.

The deck plates preferably comprise an aluminum alloy, such as 6061-T6 aluminum alloy. The top surface of the deck plate is also preferably coated with an anodized coating to prevent wear and tear of the aluminum alloy plate and to increase surface smoothness. This coating also reduces the inherent friction and galling associated with unanodized aluminum surfaces so that, in the present invention, the pin bar and pin mold assemblies will slide easily without lubrication.

Additional advantages and modifications will readily occur to those skilled in the art. The invention in its broader aspects is, not limited to the specific details, and representative devices, shown and described herein. Accordingly, various modifications may be made without departing from the spirit or scope of the general inventive concept as defined by the appended claims and their equivalents.

What is claimed is:

1. A deck plate assembly comprising:
   a deck plate having a top surface and a bottom surface;
   at least one heating element adapted for mounting to said bottom surface of said deck plate to control the temperature of said deck plate;
   a power supply electrically connected to said at least one heating element;
   a sensor mounted to said deck plate for detecting the temperature of said deck plate; and
   an insulating member mounted to said bottom surface of the said deck plate, said at least one heating element being mounted to said bottom surface of said deck plate and being located between said bottom surface of said deck plate and said insulating member.

2. An arrangement of deck plate assemblies in a kiln section of a capsule-making machine comprising:
   a plurality of deck plate assemblies, each having a deck plate, at least one heating element adapted for mounting to said deck plate to control the temperature of said deck plate, and a power supply electrically connected to said at least one heating element;
   a plurality of kilns positioned above said plurality of deck plate assemblies;
   vertical supports adapted to support said plurality of deck plate assemblies and said plurality of kilns; and
   a plurality of insulator brackets adapted to mount said plurality of deck plate assemblies to said vertical supports;
   wherein said plurality of deck plate assemblies are adapted to support a plurality of pin bar and pin mold assemblies with the pin molds extending away from said plurality of deck plate assemblies and toward said plurality of kilns.

3. An arrangement of deck plate assemblies according to claim 2 wherein:
   each of said deck plate assemblies has an individual power supply to heat each of said deck plate assemblies to a temperature independent of the temperature of adjacent ones of said deck plate assemblies.

4. An arrangement of deck plate assemblies according to claim 2 wherein:
   said plurality of deck plate assemblies comprise pairs of adjacent deck plate assemblies, and said adjacent deck plate assemblies of each of said pairs share a power supply so that said deck plates of each of said adjacent deck plate assemblies are heated to the same temperature.

5. An arrangement of deck plate assemblies according to claim 2 wherein:
   said deck plate of each of said plurality of deck plate assemblies includes a top surface, a bottom surface, and four heating elements mounted to said bottom surface; and
   said four heating elements are mounted to said bottom surface of said deck plate, one of said four heating elements mounted to each of four quadrants of said bottom surface so that, when a first deck plate of a first deck plate assembly is mounted adjacent a second deck plate of a second deck plate assembly, said heating elements mounted on one half of said bottom surface of said first deck plate are spaced equidistant from said heating elements mounted on an other half of said bottom surface of said second deck plate.

6. An arrangement of deck plate assemblies according to claim 2 wherein:
   said plurality of insulator brackets insulator brackets mounted to said vertical supports and extend along side edges of each said deck plate of said deck plate assemblies.

7. An arrangement of deck plate assemblies according to claim 6 wherein:
   said insulator brackets comprise H-shaped brackets of glass filled nylon.

* * * * *